Feb. 28, 1961        E. GOLDBERG ET AL        2,972,926
REFRACTOMETERS

Original Filed Aug. 20, 1951        2 Sheets-Sheet 1

INVENTORS
EMANUEL GOLDBERG
HERBERT GOLDBERG
BY
Richards & Geier
ATTORNEYS

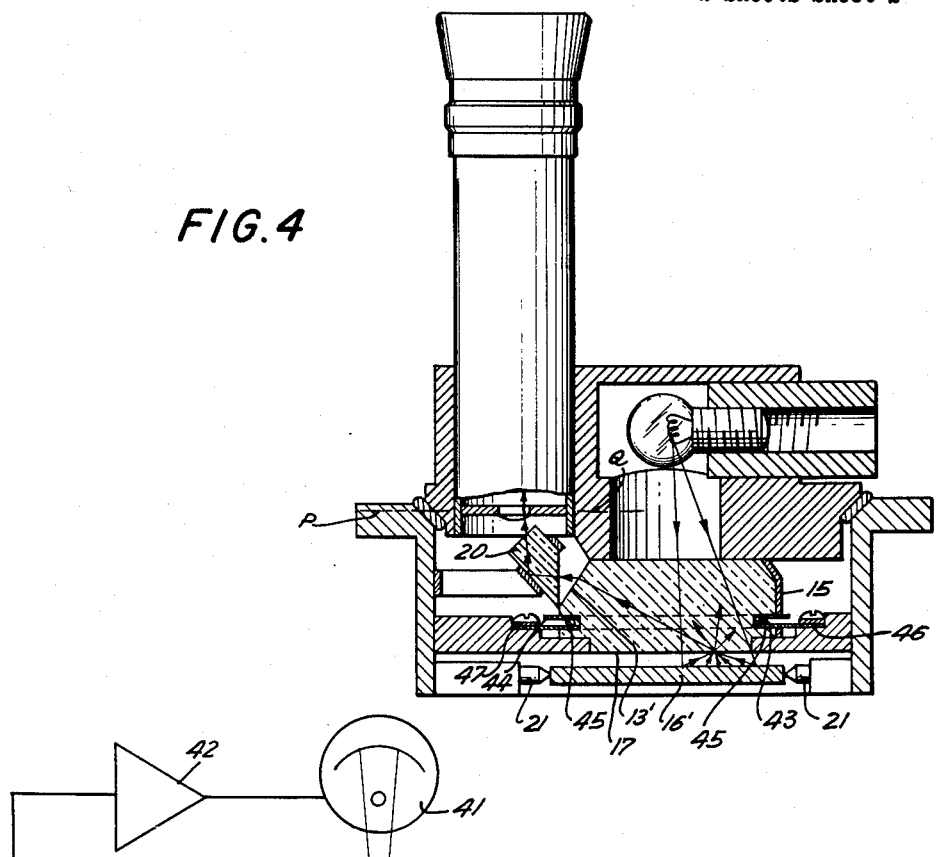
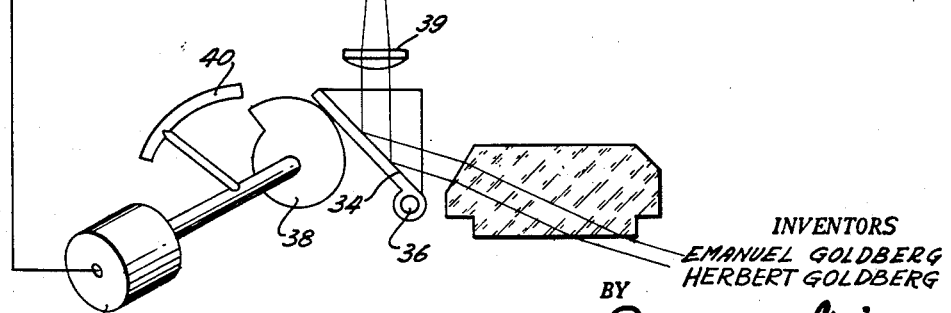

United States Patent Office 2,972,926
Patented Feb. 28, 1961

2,972,926
REFRACTOMETERS

Emanuel Goldberg, 200 Dizengoff Road, Tel Aviv, Israel, and Herbert Goldberg, Keene, N.H.

Original application Aug. 20, 1951, Ser. No. 242,608, now Patent No. 2,768,553, dated Oct. 30, 1956. Divided and this application Oct. 22, 1956, Ser. No. 620,782

8 Claims. (Cl. 88—14)

This invention relates to refractometers, and is a division of Ser. No. 242,608, filed Aug. 20, 1951, now Patent No. 2,768,553.

Various kinds of refractometer are known for both laboratory and industrial use. Most of them are based on the measurement of the angle of total reflection of light. They have the common drawback that the contrast between the bright and dark portions of the field of vision is not very marked. Since the refractometric measurement consists in reading the position of the dividing line between the bright and dark portions relative to a scale provided in the telescope part of the instrument the exactness of the readings has not been so great, and the applicability of refractometers not so universal, as the soundness of the underlying principle and the precision of construction of these instruments would have warranted. For example, it has virtually not been possible so far to build refractometers of this type into the wall of pipes, chemical reaction vessels, concentrating or other apparatus for the current testing without sampling of the fluid contained therein or passing therethrough.

This invention has the object to provide refractometers that are free from the drawback aforesaid, thereby increasing the exactness of measurements made therewith and widening the range of applicability of the instruments.

It is, of course, known that light must not enter the refractometer prism otherwise than along the path provided for the purpose in each particular construction. This is prevented thereby that the "function-less" surfaces of the refractometer prism, that is, those serving neither as interfaces with the fluid to be tested, nor for the transmission of light from the source of light (where this enters the prism primarily through a surface other than the aforesaid interface), nor for the transmission of the light to the telescope, are covered, as a rule, by parts of the casing of the instruments.

The present invention is based on the new and surprising observation that the lack of contrast between the portions of the field of vision is due to parasitic light entering the telescope from the prism in spite of the aforesaid covering-up of the function-less prism surfaces, and that such parasitic light is produced thereby that light originally entering the prism in the regular way is reflected along parasitic paths within the prism by reflection on one, several or all of the function-less surfaces of the prism, and at least a part of the rays thus reflected is thrown into the telescope.

Accordingly, the invention consists in refractometers wherein one, more or all of the function-less surfaces (as herein defined) of the refractometer prism are rendered non-reflecting.

The invention provides two ways of rendering said surfaces non-reflecting. One way consists in covering the surface directly with a dark layer that absorbs virtually all the light falling on the surface from within the prism. The second way is to interpose between the prism surface in question and a light-absorbing surface arranged at a distance therefrom a completely light-transmitting layer, e.g. a so-called quarter-wave anti-reflection layer of suitable refractive index, such as known, for example, in connection with photographic lenses. The former arrangement will hereinafter be referred to as absorbing layer, the second arrangement as light trap.

The result is in either case that the contrast between the bright and dark portions of the field of vision of the refractometer telescope is greatly enhanced. As a consequence, the exactness of the measurements is considerably increased and refractometry can now be extended to fields of application hitherto virtually denied to it. This extension of the applicability of refractometry brings in its wake the construction of new types of refractometer, some of which will be described hereinafter as forming equally part of the present invention.

The invention is illustrated, by way of example only, in the accompanying drawings in which:

Figs. 3 and 4 show in axial section two different built-in refractometers according to the invention;

Fig. 5 shows diagrammatically another embodiment of the invention.

Figure 1:
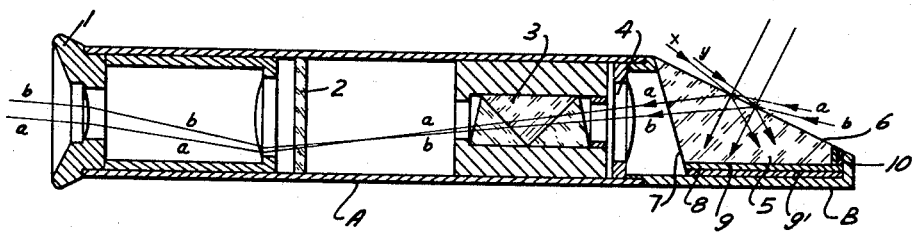
Fig. 1 is an axial section of a hand refractometer of known general construction, used mainly for industrial purposes.
Figure 2:
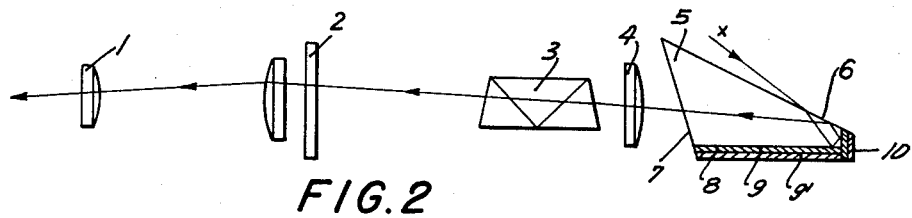
Fig. 2 is a diagram showing the production of parasitic light and its projection into the telescope of an instrument of the kind illustrated in Fig. 1.

Turning first to Figs. 1 and 2, the refractometer here shown is of a construction known in principle. It comprises a tubular telescope casing A with an extension B for housing the refractometer prism. The telescope includes the eyepiece 1, usually composed of an eye lens and a field lens, a plane glass 2 on which a scale is marked (either in terms of refractive index for a universal instrument, or in terms of concentration of a certain substance within a mixture or solution in the case of special applications), the objective lens 4 adjusted to focus an infinitely distant object onto the scale 2, and a set of direct-vision or colour-compensation prisms 3, which are preferably located between the prism 5 and the objective 4 but may be placed between the objective lens 4 and the eyepiece in order to shorten the instrument. The face 6 of the main refractometer prism 5 is turned outwards and constitutes the surface of contact or interface with the fluid to be tested, and at the same time admits primary light into the prism, while through the inner face 7 the light passes onwards to the telescope. The remaining faces of the prism are function-less, and they are covered by the casing B so as not to admit light from outside. The fluid to be tested is spread on the surface 6, or the instrument is dipped into the fluid. In either case the light is made to pass through the fluid from a source of light located outside of the instrument. Since the light should be diffused in order to impinge on the surface 6 under different angles, including an angle of incidence of 90°, a sheet of a translucent material like paper, plastics or opal glass, is arranged parallel to the surface 6 at a small distance therefrom unless the medium to be tested contains opaque particles so that the light passing therethrough is sufficiently dispersed, like in the case of milk, fruit or vegetable juices, marmalades and the like.

Fig. 1 shows light rays $a$, $b$, refracted at the interface 6 towards the telescope. These are the "regular" rays producing the bright portion of the field of vision of the telescope and allowing the determination of the refractive index of the material to be tested. Against this there are other rays $x$, $y$, which are refracted towards the prism surface 8. Fig. 2 shows diagrammatically for the ray $x$ how this light is reflected on the surface 8 towards the surface 10 and hence onwards through the surface 7 and into the telescope. In the latter this parasitic light decreases the contrast between the bright and dark portions of the field of vision.

If now, in accordance with the present invention, the surfaces 8 and 10 are made non-reflecting the rays impinging thereon are stopped and prevented from becoming parasitic. This may be done, for example, by exteriorly coating these surfaces with a dark varnish 9, black being preferred. Mechanical deterioration or peeling off of the coating may be prevented by a protecting layer 9′ of metal, glass, fabric, paper or any other suitable material, cemented thereon in any suitable manner. Or else, a layer of a vitreous, completely light-absorbing material may be fused onto these surfaces. The best results are obtained if the refractive index of the coating material is equal to or higher than that of the prism 5, but at any rate in order to avoid total reflection at the interface it should not be substantially lower than the latter. The same holds good in case a glass layer is cemented onto the absorbing layer. It is also possible to make the layer 9′ light-absorbing and to cement it to the surface 8 or 10 by means of a transparent cement which should have a refractive index as nearly equal as possible to that of the prism. The surfaces 8 and 10 and, where absorption is effected by a plate 9′, the surface of the latter as well, may advantageously be polished before the absorbing layer is applied to the said surfaces. Care should be taken to make the varnish or cement as homogeneous as possible since even small defects thereof, e.g. bubbles, reflect enough light to spoil the contrast in the field of vision.

Where a quarter-wave anti-reflection material is used the absorbing part of the light trap may simply be formed by the inner face of the casing which will preferably be blackened.

Figure 3:
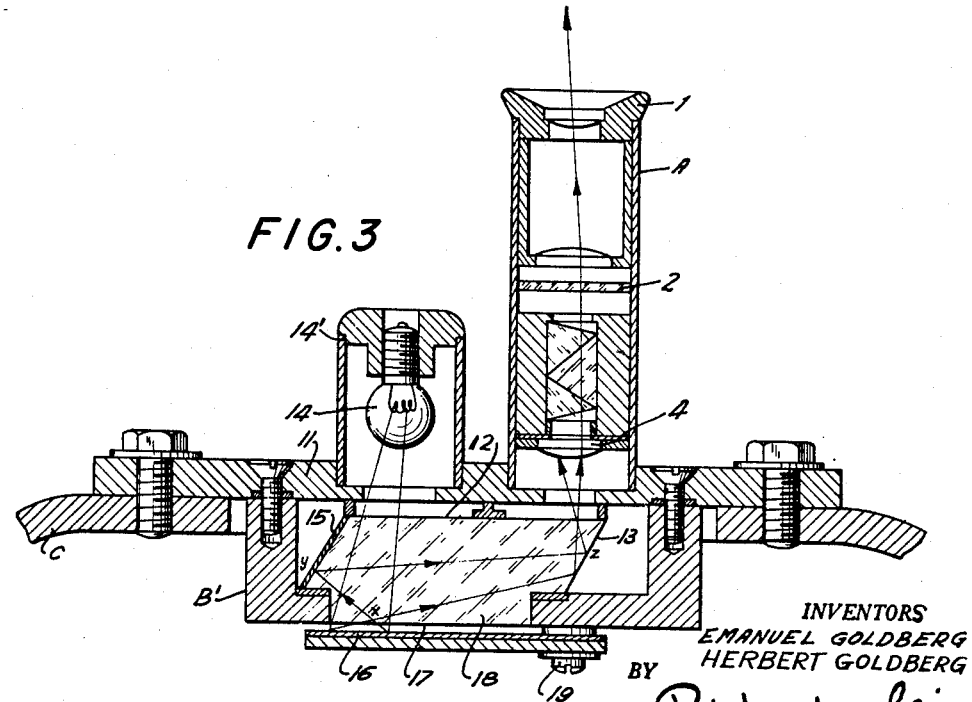

Fig. 3 shows a built-in refractometer in accordance with the present invention. This comprises a base plate 11 adapted to be mounted in the wall C of a vessel in which a process to be kept under current supervision takes place, or in a pipe, or at any place where it is desired to be able to test at any time a fluid without having to take out a sample thereof. The base plate carries the telescope casing A which projects outwardly, and the prism casing B′ which projects inwardly into the vessel or pipe. The prism 18 has quadrangular cross section, two sides 12 and 17 (the latter constituting the interface) being parallel. At two opposite ends of surface 17 the prism is rebated for jointing with the casing B′ whose outer face is flush with the surface 17. Opposite to the surface 12 of the prism, a source of light, e.g. an electric bulb 14, is enclosed in a casing 14′ mounted on the base plate 11. The light from this source passes through surfaces 12 and 17 of the prism and falls on a light diffusing surface 16 arranged at a small distance from the surface 17 so that the fluid to be tested can spread in or flow through the narrow gap between the two surfaces.

The light reflected from surface 16 re-enters the prism through the interface 17 which thus becomes a secondary-light admission surface and from which a substantial part of the light goes to the surface 13 of the prism where it is reflected into the telescope. In the construction here shown the inclination or surface 13 is so calculated that the light leaves the prism substantially at right angles to surfaces 17 and 12, but the surface 13 may instead be given a different inclination in order to provide, by subsequent refraction on surface 12, partial or complete correction for the colour dispersion occurring on surface 17, where this appears to be desirable. The reflection on surface 13 may either be by way of total reflection, or by means of a reflection coating on surface 13, e.g. silver or aluminium. This, then, is the regular light path.

In addition thereto, some light enters the prism through surface 17 in other directions and goes to the functionless surface 15 opposite surface 13, and a portion of it would go along the path x—y—z and be able to enter the telescope as parasitic light. This is prevented by making the surface 15 non-reflecting in the manner described above.

If the refractometer is destined for use in connection with a viscous liquid it is advantageous to put the surface 16 on a plate movable relative to the interface, for example, pivotable about an axle 19 or in the manner described hereafter in connection with Fig. 5. Or else, the plate may be arranged for movement parallel to its own plane. Instead, or in addition to, the possibility of moving the plate carrying the surface 16 it would be possible to provide a wiper similar to a wind-shield wiper, for sweeping the interface. Control means will be provided for the movements of the plate or wiper so as to allow to actuate them from outside.

No light-diffusing surface 16 is needed at all in such cases where the liquid to be tested is sufficiently turbid to reflect itself the amount of diffused light needed for the measurement. This applies, for example, to the refractometry of citrus juice concentrates in the process of concentration.

Fig. 4 illustrates a refractometer that is similar in principle to the one shown in Fig. 3 but differs therefrom in some respects. The principal difference is that the regular path of the light includes a prism or wedge 20 which throws the light into the telescope after it has left the prism through the surface 13′. The latter may be designed to provide complete or partial correction for the colour dispersion occurring on surface 17. This prism may also be replaced by a mirror if colour correction is not necessary, or is provided for otherwise. A minor difference is in the mounting of plate 16′ carrying the light-diffusing surface, which is rotatable about an axis represented by pins 21. Another difference between this embodiment of the invention and that illustrated in Fig. 3 lies in the construction of the seal between the main refractometer prism and the body of the instrument. Connecting grooves 43 have been milled into all four sides of the prism. A piece of thin rubber tubing 44, similar to bicycle tubing, has been placed around the prism and drawn into the groove 43 by tightening a wire ring 45 place over it. The seal between the rubber and the glass prism which has thus been secured, can be improved by placing a suitable bonding cement or resin between them. The rim 46 of the rubber flange thus formed is attached to the instrument body by conventional means such as a pressure ring 47 secured by screws with or without the use of bonding cement. The rubber tube may be replaced by a thin metal or plastic ring or rectangular section which is cemented into the groove 43 and the outer rim of which is fastened to the instrument body. Yet other minor differences between this embodiment of the invention and the one illustrated in Fig. 3 can be seen from the drawings and are mere constructional details which do not require description.

Fig. 5 illustrates diagrammatically a refractometer similar in principle to that shown in Fig. 4, but with the difference that the scale in the focal plane of the objective has been replaced by a mark or a slit 35. The prism 34, or a mirror which may take its place, can be rotated about an axis 36, and its orientation be controlled either manually or electrically, for instance through a motor 37 and a cam 38 as shown in the drawing. In this type of refractometer the measurement is carried out by rotating the mirror until the line which separates the dark and bright portions of the image in the focal plane of the objective 39 coincides with the slit 35, and by reading the corresponding angular orientation of the prism 34 on scale 40. The instrument may be designed to be automatic and recording in several ways, for instance a photo-electric cell 41 may be placed behind the slit 35 and may be connected through suitable electronic amplifiers 42 to the servomotor 37. According to the signals received from the photo-electric cell the servomotor will tend to rotate the prism 34 so as to position the separation line of the optical image on the slit 35. Comercially available controllers and recorders may be attached to the servomotor in well known ways.

We claim:

1. A refractometer comprising a casing, a telescope mounted on said casing for the observation of refracted light passing through said casing, a testing prism within said casing and having an interface, said prism having one surface exposed to the medium to be tested and receiving refracted light from said medium, a source of light mounted on said casing and located at a point separated by a part of the prism from said exposed surface, said prism having at least one surface inside the casing located outside of the direct path of the light emitted from said source, an anti-reflection quarter wave layer covering the last-mentioned surface, said prism having another surface arranged behind said quarter wave layer and adapted to absorb light transmitted through said quarter wave layer from inside said prism, the path of the light extending from the source of light through the prism to the interface of the latter with the medium to be tested, out of the interface into the medium, back from the medium through the interface and through the prism to the telescope.

2. A refractometer as claimed in claim 1, wherein the source of light and telescope are located in front of one and the same surface of the prism substantially opposite the interface, the refractometer comprising means for preventing direct passage of light from the source of light to the telescope.

3. A refractometer as claimed in claim 1, wherein the source of light and telescope are located in front of different surfaces of the prism, the source of light being located in front of a surface extending substantially opposite the interface and the telescope being located in front of a surface forming an angle with the interface.

4. A refractometer as claimed in claim 1, comprising a gasket within the casing for preventing the access of medium from the interface of the prism into the casing.

5. In combination with a vessel containing the medium to be tested, a refractometer as claimed in claim 1, wherein the casing comprises a mounting plate adapted to be mounted on the wall of said vessel for allowing refractometering of the medium without withdrawing a sample.

6. A refractometer as claimed in claim 5, comprising a wiper in conjunction with an interface and adapted to clean the latter, and means actuating said wiper from outside said vessel.

7. A refractometer, comprising a casing, a telescope mounted on said casing for the observation of refracted light passing through said casing, a testing prism within said casing and having an interface, and a surface exposed to the medium to be tested, a source of light mounted on the casing and located at a point separated by a part of the prism from said exposed surface, said prism having a surface adapted to diffuse light in front of said interface at a distance therefrom and to direct diffused light through said medium on to said interface, and at least one surface inside the casing located outside of the direct beam of the light emitted from said source of light, an anti-reflection quarter wave layer covering the last-mentioned surface, said prism having another surface arranged behind said quarter wave layer and adapted to absorb light transmitted through said quarter wave layer from inside said prism.

8. A refractometer as claimed in claim 7 wherein said light diffusing surface in front of the interface is displaceable relatively to the latter.

References Cited in the file of this patent

UNITED STATES PATENTS

| | | |
|---|---|---|
| 2,394,949 | Straat | Feb. 12, 1946 |
| 2,447,828 | West | Aug. 24, 1948 |
| 2,502,913 | Arnulf | Apr. 4, 1950 |
| 2,569,127 | Eltenton | Sept. 25, 1951 |